(12) United States Patent
Owechko

(10) Patent No.: US 12,499,518 B2
(45) Date of Patent: Dec. 16, 2025

(54) USING BLIND SOURCE SEPARATION TO REDUCE NOISE IN A SENSOR SIGNAL

(71) Applicant: HRL Laboratories, LLC, Malibu, CA (US)

(72) Inventor: Yuri Owechko, Newbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 286 days.

(21) Appl. No.: 18/185,307

(22) Filed: Mar. 16, 2023

(65) Prior Publication Data

US 2024/0311978 A1    Sep. 19, 2024

(51) Int. Cl.
*G06T 5/70*    (2024.01)
*B60K 31/00*    (2006.01)
*B62D 6/00*    (2006.01)

(52) U.S. Cl.
CPC .............. *G06T 5/70* (2024.01); *B60K 31/00* (2013.01); *B62D 6/00* (2013.01); *G06T 2207/30261* (2013.01)

(58) Field of Classification Search
CPC ............. G06T 5/70; G06T 2207/30261; G06F 18/2134; G06F 18/2135; B60K 31/00; B62D 6/00
See application file for complete search history.

(56) References Cited

U.S. PATENT DOCUMENTS

| | | | | |
|---|---|---|---|---|
| 5,825,671 A | * | 10/1998 | Deville | H03G 3/32 |
| | | | | 702/194 |
| 7,133,699 B1 | * | 11/2006 | Owechko | G01S 3/74 |
| | | | | 455/67.11 |
| 10,885,928 B1 | * | 1/2021 | Owechko | G10L 21/028 |
| 2001/0033248 A1 | * | 10/2001 | Owechko | H01Q 3/2605 |
| | | | | 342/371 |
| 2005/0055388 A1 | * | 3/2005 | Maekawa | G06F 18/2134 |
| | | | | 708/160 |
| 2005/0060142 A1 | * | 3/2005 | Visser | H04R 3/005 |
| | | | | 704/201 |
| 2005/0105644 A1 | * | 5/2005 | Baxter | H03H 21/0012 |
| | | | | 375/316 |
| 2006/0046672 A1 | * | 3/2006 | Kalhan | H04L 25/03006 |
| | | | | 455/177.1 |
| 2007/0263936 A1 | * | 11/2007 | Owechko | G06V 40/103 |
| | | | | 382/224 |
| 2008/0228470 A1 | * | 9/2008 | Hiroe | G10L 21/0272 |
| | | | | 704/203 |
| 2009/0043588 A1 | * | 2/2009 | Takeda | G10L 21/0272 |
| | | | | 704/E21.001 |

(Continued)

FOREIGN PATENT DOCUMENTS

| | | | | |
|---|---|---|---|---|
| CN | 109272054 A | * | 1/2019 | ........ G06K 9/0051 |
| WO | WO-2006125960 A2 | * | 11/2006 | ........ G06K 9/0051 |

*Primary Examiner* — John M Zaleskas
(74) *Attorney, Agent, or Firm* — Wheatstone IP Law Corporation; Milad G. Shara

(57) ABSTRACT

A computer system is disclosed for processing a sensor signal comprising a signal component and a noise component. A signal shifter is configured to generate a shifted version of the sensor signal, and a blind source separator (BSS) module is configured to process the sensor signal and the shifted version of the sensor signal to generate a signal output representing the signal component of the sensor signal.

22 Claims, 7 Drawing Sheets

(56) References Cited

U.S. PATENT DOCUMENTS

| | | | |
|---|---|---|---|
| 2018/0299527 A1* | 10/2018 | Helwani | H04R 1/406 |
| 2019/0080210 A1* | 3/2019 | Owechko | G06F 18/10 |
| 2019/0205696 A1* | 7/2019 | Owechko | G06F 18/2134 |
| 2021/0161455 A1* | 6/2021 | Sudo | A61B 5/344 |
| 2023/0192140 A1* | 6/2023 | Owechko | B60W 60/00188 |
| | | | 701/14 |
| 2024/0155290 A1* | 5/2024 | Hiroe | G10L 21/0308 |

* cited by examiner

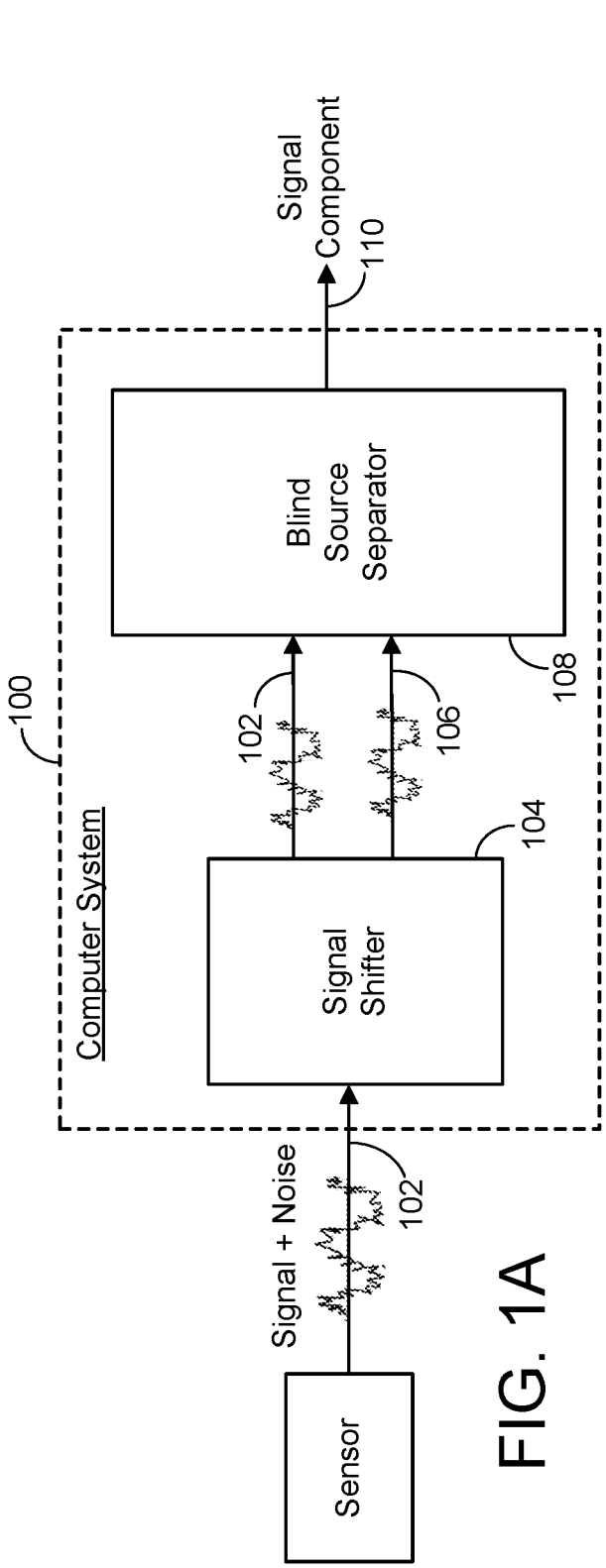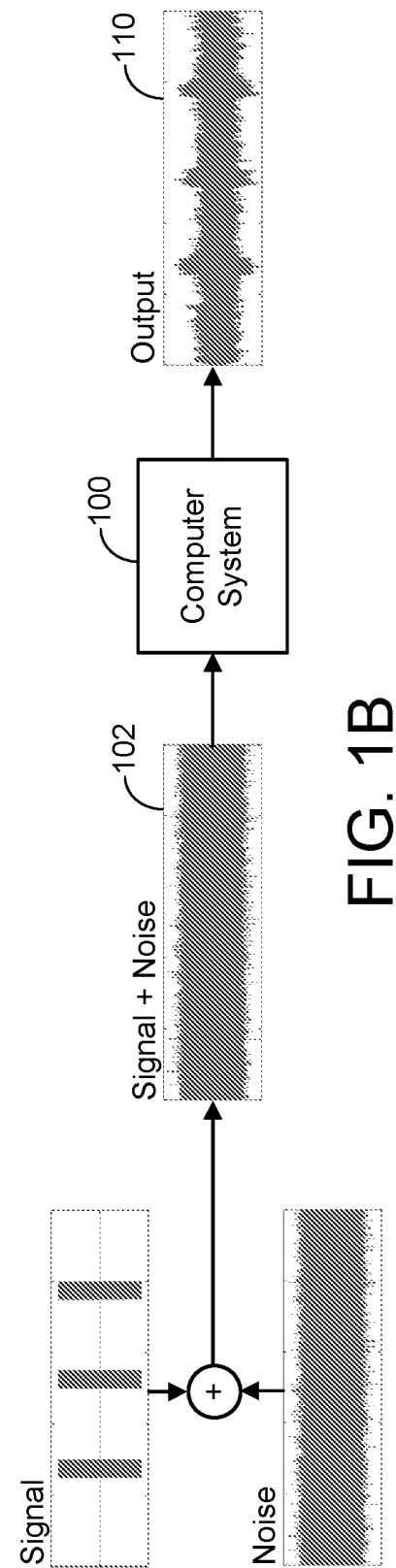

USING BLIND SOURCE SEPARATION TO REDUCE NOISE IN A SENSOR SIGNAL

TECHNICAL FIELD

This specification relates to noise reduction in signal processing.

BACKGROUND

It is desirable to improve performance of sensors in high noise conditions such as radar and camera sensors used in perception systems of autonomous vehicles. Other applications of noise reduction include visible, IR, and hyperspectral cameras as well as radar sensors used in surveillance, sonar, navigation, and target recognition. Prior art noise reduction and signal extraction methods based on neural networks and deep learning require large amounts of data for training and learning models of signals and do not generalize well to unknown types of signals and noise not represented in the training data. Prior art signal extraction methods based on correlation require prior models or examples of signals and do not work well on unknown signals.

DESCRIPTION OF DRAWINGS

FIG. 1A shows an embodiment of a computer system for reducing noise in a sensor signal using blind source separation.

FIG. 1B shows an example of a sensor signal comprising a signal component and a noise component, and the resulting signal output by the computer system after noise reduction.

DETAILED DESCRIPTION

Figure 2:
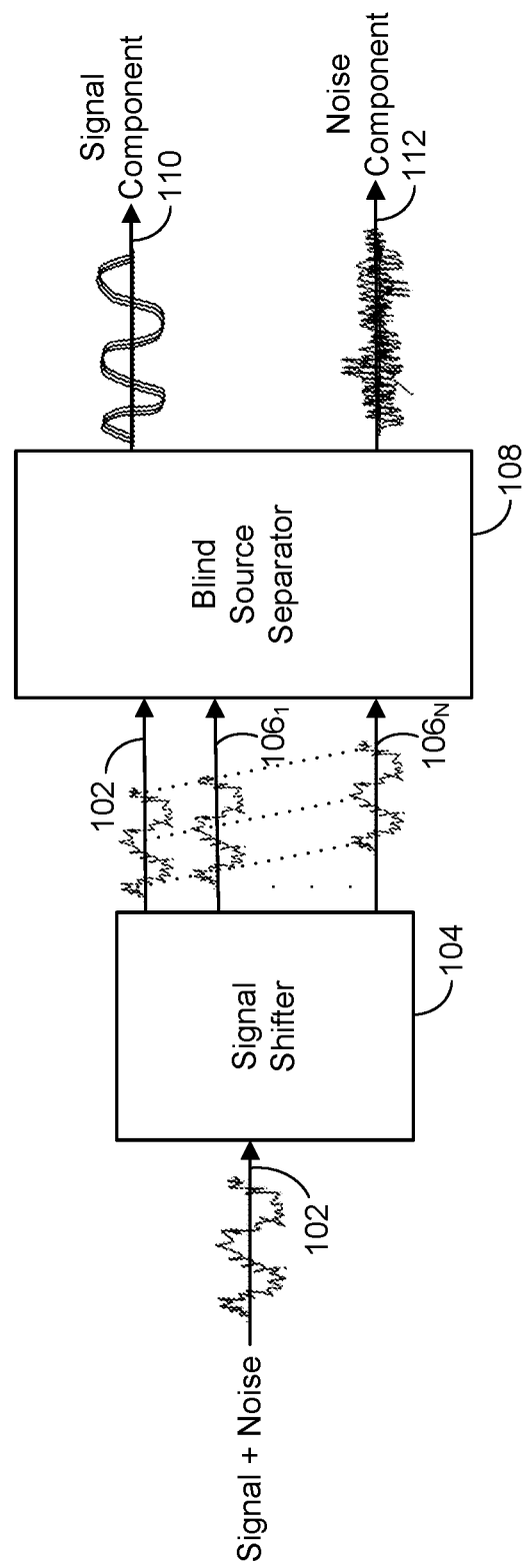
FIG. 2 shows an embodiment wherein a blind source separator generates an output signal representing a signal component and an output representing a noise component of the sensor signal.

FIG. 1A shows a computer system 100 according to an embodiment for processing a sensor signal 102 comprising a signal component and a noise component. The computer system comprises a computer implemented signal shifter 104 configured to generate a shifted version 106 of the sensor signal 102, and a computer implemented blind source separator module 108 configured to process the sensor signal 102 and the shifted version of the sensor signal 106 to generate a signal output 110 representing the signal component of the sensor signal 102. FIG. 1B illustrates an example of the computer system 100 reducing noise in a sensor signal comprising a signal component and a noise component.

Blind source separation algorithms are conventionally used to separate multiple source signals in a mixed signal, such as two people talking in a room, without knowledge of the source signals or the mixing process. These conventional techniques involve generating multiple mixed signals generated by a plurality of respective sensors (e.g., microphones) which are processed by the blind source separation algorithm. In contrast, in the embodiments disclosed herein the multiple mixed signals input into the blind source separation algorithm are shifted versions of a single sensor signal which extends the application to environments that may operate with only a single sensor (e.g., a single microphone or antenna). Blind source separation algorithms are well known to those skilled in the art, with a few examples being Independent Component Analysis (ICA), Nonnegative Matrix Factorization (NMF), and Principal Component Analysis (PCA). Although the prior art has suggested using blind source separation in various noise reduction and noise cancellation applications, these prior art references do not disclose or suggest the signal shifting technique or other improvements in the embodiments disclosed herein.

Referring again to the embodiment of FIG. 1A, the computer system 100 is configured to reduce noise in a sensor signal 102 by processing the sensor signal 102 and one or more shifted versions 106 of the sensor signal 102. In one embodiment, "shifting" the sensor signal 102 means translating the sensor signal 102 relative to itself in one or more dimensions. The result of shifting the sensor signal is that the signal component is at least partially correlated across the shifted signals while the noise component is substantially uncorrelated since the mutual information between shifted versions of the same noise signal is typically very low. Because a blind source separator, such as ICA, separates signals by maximizing the independence in the outputs, the blind source separator 108 of FIG. 1A effectively separates the correlated signal component of the shifted noisy signals from the uncorrelated noise component. In one embodiment, the blind source separator 108 will transform the shifted signal mixtures into a slightly blurred version of the signal component represented by a first signal output, and the noise component represented by a second signal output. The slight blurring depends on the shift interval and the number of input mixtures required for good separation of the signal component from the noise component.

FIG. 2 shows an embodiment of the computer system 100 wherein the signal shifter 104 generates N shifted versions $106_1$-$106_N$ of the sensor signal 102 for processing by the blind source separator 108. This embodiment may improve the noise reduction in the signal output 110 by providing additional signals having correlated signal components and uncorrelated noise components. The shifted resolution between the N shifted signals may be any suitable offset, such as one or more sample periods in a digital signal. Also in the embodiment of FIG. 2, the blind source separator 108 may output a signal 112 representing the noise component of the sensor signal 102 which may be used, for example, to characterize and/or calibrate the performance of the sensor that generates the sensor signal, or further reduce the noise in the signal output 110 using well known noise cancelling algorithms.

Figure 3:
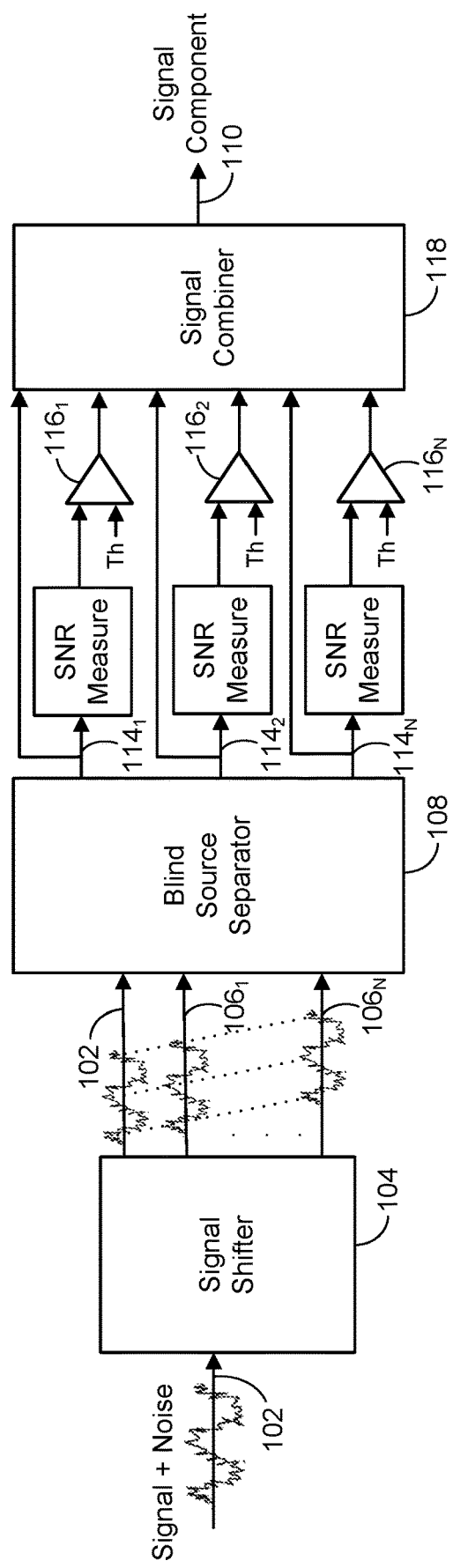
FIG. 3 shows an embodiment wherein the blind source separator generates a plurality of independent component signals, wherein the independent component signals having a signal-to-noise ratio measurement that exceeds a threshold are combined to generate a signal output.

FIG. 3 shows an embodiment of the computer system 100 wherein the blind source separator 108 generates a plurality of independent component signals $114_1$-$114_N$ which are processed to generate the signal output 110 representing the signal component. In this embodiment, a suitable signal-to-noise (SNR) measurement (e.g., peak SNR or PSNR) is generated for each component signal $114i$ which is compared to a threshold Th by a corresponding comparator $116i$. For each SNR measurement (SNRM) that exceeds the threshold, a signal combiner 118 combines the corresponding component signals $114i$ in order to generate the signal output 110. The signal combiner 118 may implement any suitable signal processing to perform the combining operation, such as a simple adder for adding the component signals, or for adding a deconvolved version of each component signal as described below.

Figure 4:
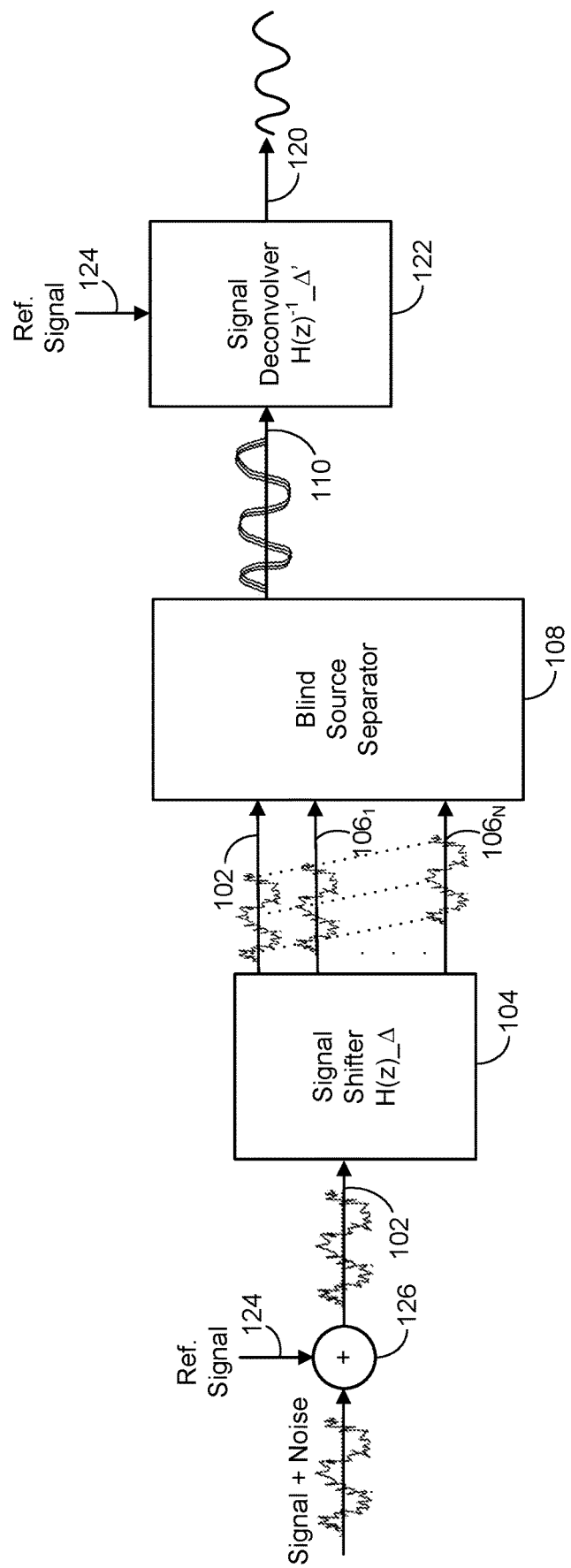
FIG. 4 shows an embodiment wherein a reference signal is added to the sensor signal which is used to deconvolve the output signal of the blind source separator.

FIG. 4 shows an embodiment of the computer system 100 wherein the blind source separator 108 generates an signal output 110 that comprises the addition of the signal component in each of the sensor signal 102 and shifted versions of the sensor signal $106_1$-$106_N$. That is, the signal output 110 will comprise the combination of shifted component signals such as shown in FIG. 4, wherein in one embodiment the signal output 110 is further processed in order to effectively align the shifted component signals into a more focused signal output 120. In the embodiment of FIG. 4, a signal deconvolver 122 implements an inverse transfer function $H(z)^{-1}\_\Delta$ of the signal shifter 104 (having transfer function $H(z)^{-1}\_\Delta$), where $\Delta$ represents the offset between the shifted signals input to the blind source separator 108. In one embodiment, the offset $\Delta$ between the shifted versions of the component signals in the signal output 110 is the same as the offset $\Delta$ in the shifted versions of the sensor signal $106_1$-$106_N$, and therefore the signal deconvolver 122 deconvolves the signal output 110 based on this known offset $\Delta$. In another embodiment, the operation of the blind source separator 108 results in shifted versions of the signal component in the signal output 110 having an unknown offset $\Delta'$ that is different from the offset $\Delta$ in the shifted sensor signals $106_1$-$106_N$. Accordingly in one embodiment shown in FIG. 4, a reference signal 124 is added 126 to the sensor signal which is then used by the signal deconvolver 122 to detect the unknown offset $\Delta'$ of the component signals in the signal output 110. Any suitable technique may be employed to detect the offset $\Delta'$ between the reference signals embedded within each component signal, such as using a matched filter matched to the known reference signal 124.

In the embodiment of FIG. 3, the signal combiner 118 may comprise the signal deconvolver 122 of FIG. 4 for each of the independent component signals $114_1$-$114_N$ having an SNR measurements that exceeds the threshold Th. The plurality of deconvolved signals 120 may then be combined (e.g., added) in order to generate the noise reduced signal output 110.

Figure 5A:
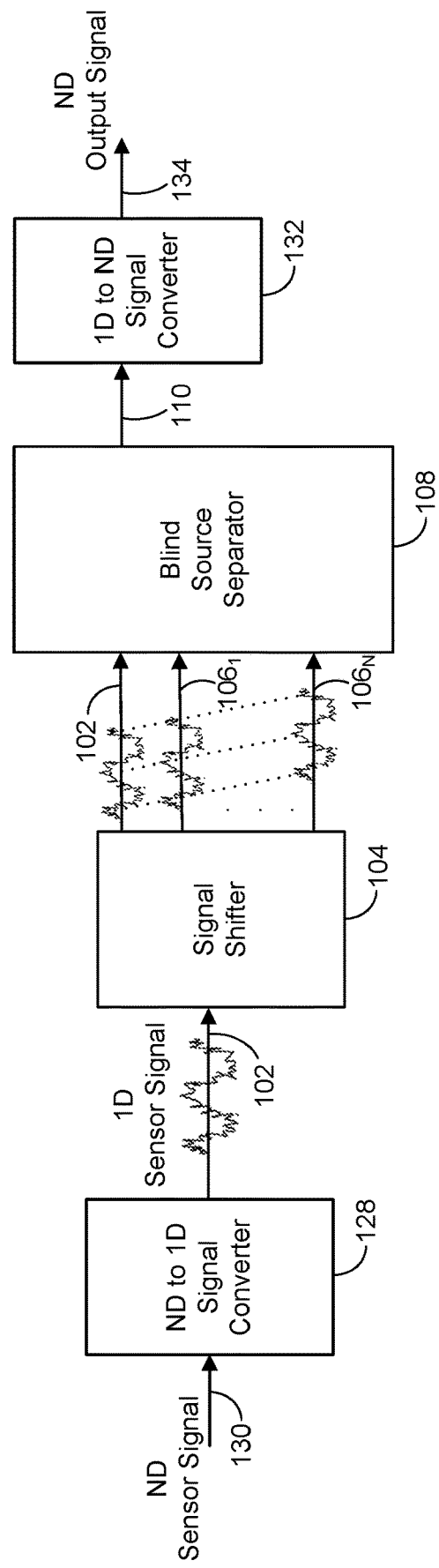
FIG. 5A shows an embodiment wherein a multi-dimensional (ND) sensor signal is converted into a one-dimensional (1D) signal prior to processing with the blind source separator.
Figure 5B:
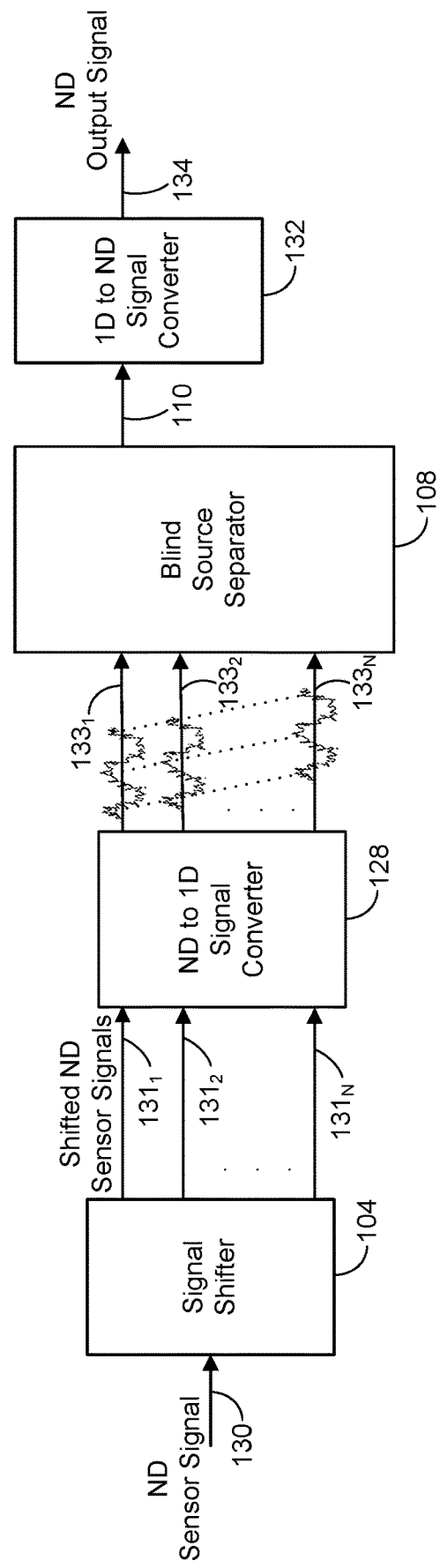
FIG. 5B shows an embodiment wherein a multi-dimensional (ND) sensor signal is shifted in one or more dimensions to generate multiple shifted ND sensor signals which are converted into 1D sensor signals processed by the blind source separator.

In the embodiment of FIG. 1A, the sensor signal 102 may represent any suitable physical observation in the real world, such as an audio signal, electrocardiogram signal, or any other similar one-dimensional (1D) signal. In another embodiment, the sensor signal 102 may represent a multidimensional (ND) signal, such as a 2D image of an object or a 2D spectrogram that provides an image representation of a signal's frequency spectrum. FIG. 5A shows an embodiment wherein the computer system 100 comprises a ND signal converter 128 for converting a ND sensor signal 130 into a 1D sensor signal 102 that is input into the signal shifter 104. That is in one embodiment, a ND sensor signal is converted into a 1D sensor signal which is then processed to achieve noise reduction in the 1D sensor signal. After processing by the blind source separator 108, the signal output 110 may be processed by a 1D to ND signal converter 132 in order to convert the 1D signal output 110 into a ND signal output 134 (i.e., to convert the signal output back into the domain of the real world application). In another embodiment shown in FIG. 5B, the signal shifter 104 may operate on the ND sensor signal 130 such that the sensor signal is shifted in the ND domain to generate multiple shifted ND sensor signals $131_1$-$131_N$. Each shifted ND sensor signal $131_1$-$131_N$ is then converted into a corresponding 1D sensor signal $133_1$-$133_N$ input into the blind source separator 108. In one embodiment, a combination of horizontal and vertical shifts may be used to maximize the mutual information between the shifted signals.

Figure 6:
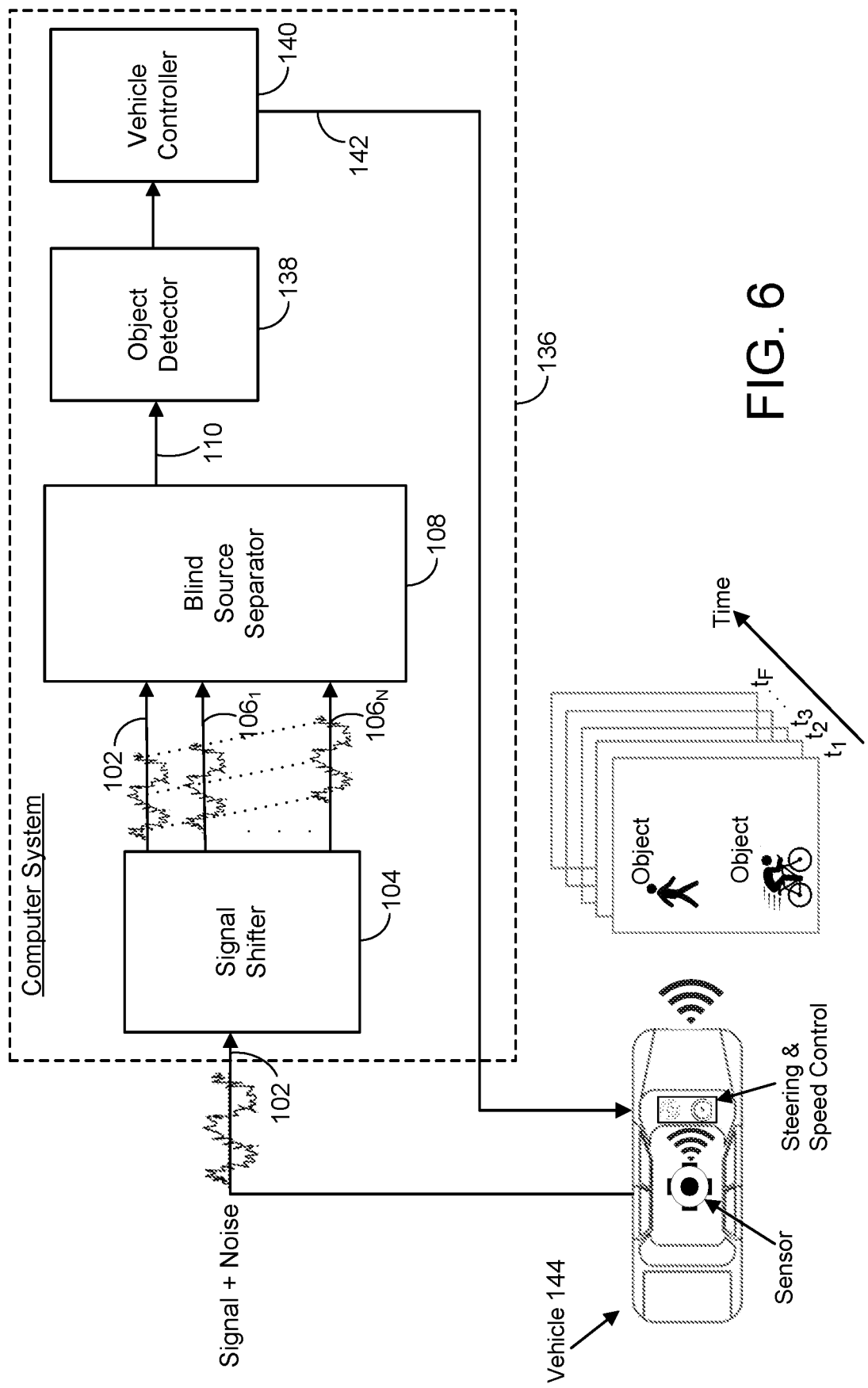
FIG. 6 shows a vehicle system according to an embodiment comprising a computer system for detecting objects from a sensor signal after noise reduction using the blind source separator.

FIG. 6 shows an embodiment of a computer system 136 of a vehicle control system comprising a signal shifter 104 and blind source separator 108 for reducing noise in a sensor signal 102. The computer system 136 further comprises an object detector 138 for detecting an object from the signal output 110 of the blind source separator 108, and a vehicle control module 140 configured to generate a control signal 142 for controlling a vehicle 144. In one embodiment, the control signal 142 controls at least one of the steering of the vehicle 144 or the speed of the vehicle 144. The vehicle 144 comprise a suitable sensor (e.g., camera, radar, lidar, etc.) for generating a sensor signal 102 for processing by the computer system 136. In one embodiment, the sensor signal 102 may be a 2D sensor signal representing an object (e.g., pedestrian, bicyclist, etc.), wherein the 2D sensor signal may be transformed into a 1D sensor signal for processing by the computer system 136 as described above with reference to FIG. 5. In this embodiment, the signal output 110 of the blind source separator 108 may be converted back into a 2D sensor signal prior to processing by the object detector 138.

In the embodiments described herein, a noisy sensor signal may be processed by a computer system to reduce the noise component of the sensor signal without prior knowledge of the signal component buried in the noise (using blind source separation). The embodiments improve performance of sensors in high noise conditions and is applicable across a wide range of applications, such as radar and camera sensors used in controlling vehicles (e.g., driver assisted or autonomous vehicle control). Although in the embodiment of FIG. 6 the vehicle being controlled is an automobile, the embodiments may also be employed to control other types of vehicles, such as aerial vehicles (e.g., manned and unmanned aircraft), robotics, androids, industrial automation, weapons systems, etc. In addition, any suitable sensor signal may be processed to reduce the noise component, such as visible, IR, acoustic, and hyperspectral camera signals.

In the embodiments described herein, the sensor signal 102 may be preprocessed using any suitable signal processing techniques prior to being input into the signal shifter 104. In one embodiment, the input sensor signal 102 may be a shifted version of a base signal emanating from a sensor such that all of the signals input into the blind source separator 108 may be shifted versions of a base sensor signal.

In one embodiment, the computer system in the above described embodiments (e.g., computer system 100 of FIG. 1A) comprises one or more processors configured to perform calculations, processes, operations, and/or functions associated with a program or algorithm. The processes and steps in the example embodiments may be instructions (e.g., software program) that reside within a non-transitory computer readable memory executed by the one or more processors of computer system. When executed, these instructions cause the computer system to perform specific actions and exhibit specific behavior for the example embodiments disclosed herein. The processors may include one or more of a single processor or a parallel processor, an application-specific integrated circuit (ASIC), programmable logic array (PLA), complex programmable logic device (CPLD), or a field programmable gate array (FPGA).

The computer system may be configured to utilize one or more data storage units such as a volatile memory unit (e.g., random access memory or RAM such as static RAM, dynamic RAM, etc.) coupled with address/data bus. Also, the computer system may include a non-volatile memory units (e.g., read-only memory ("ROM"), programmable ROM ("PROM"), erasable programmable ROM ("EPROM"), electrically erasable programmable ROM "EEPROM"), flash memory, etc.) coupled with an address/data bus. A non-volatile memory unit may be configured to store static information and instructions for a processor. Alternatively, the computer system may execute instructions retrieved from an online data storage unit such as in "Cloud" computing.

The computer system may include one or more interfaces configured to enable the computer system to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

The computer system may include an input device configured to communicate information and command selections to a processor. Input device may be an alphanumeric input device, such as a keyboard, that may include alphanumeric and/or function keys. The computer system may further include a cursor control device configured to communicate user input information and/or command selections to a processor. The cursor control device may be implemented using a device such as a mouse, a track-ball, a track-pad, an optical tracking device, or a touch screen. The cursor control device may be directed and/or activated via input from an input device, such as in response to the use of special keys and key sequence commands associated with the input device. Alternatively, the cursor control device may be configured to be directed or guided by voice commands.

The processes and steps for the example may be stored as computer-readable instructions on a compatible non-transitory computer-readable medium of a computer program product. Computer-readable instructions include a set of operations to be performed on a computer, and may represent pieces of a whole program or individual, separable, software modules. For example, computer-readable instructions include computer program code (source or object code) and "hard-coded" electronics (i.e. computer operations coded into a computer chip). The computer-readable instructions may be stored on any non-transitory computer-readable medium, such as in the memory of a computer or on external storage devices. The instructions are encoded on a non-transitory computer-readable medium.

A number of example embodiments have been described. Nevertheless, it will be understood that various modifications may be made without departing from the spirit and scope of the devices and methods described herein.

What is claimed is:

1. A computer system for processing a sensor signal comprising a signal component and a noise component, the computer system comprising:
   a computer implemented signal shifter configured to generate a shifted version of the sensor signal; and
   a computer implemented blind source separator (BSS) module configured to process the sensor signal and the shifted version of the sensor signal to generate a signal output representing the signal component of the sensor signal; wherein
   the BSS module is further configured to generate a noise output representing the noise component of the sensor signal based on the processing by the BSS module of the sensor signal and the shifted version of the sensor signal.

2. The computer system as recited in claim 1, wherein the BSS module comprises a computer implemented independent component analysis (ICA) module.

3. The computer system as recited in claim 1, wherein the BSS module is configured to:
   generate a plurality of independent component signals; and
   process the independent component signals to generate the signal output.

4. The computer system as recited in claim 1, further comprising a computer implemented converter for converting a multiple-dimension (ND) sensor signal into a one-dimensional (1D) sensor signal, wherein the signal shifter generates the shifted version of the sensor signal by shifting the 1D sensor signal.

5. The computer system as recited in claim 1, further comprising a computer implemented converter for converting a multiple-dimension (ND) sensor signal into a one-dimensional (1D) sensor signal, wherein the signal shifter generates the shifted version of the sensor signal by shifting the ND sensor signal.

6. The computer system as recited in claim 1, wherein the sensor signal represents an image of an object.

7. A computer system for processing a sensor signal comprising a signal component and a noise component, the computer system comprising:
   a computer implemented signal shifter configured to generate a shifted version of the sensor signal; and
   a computer implemented blind source separator (BSS) module configured to process the sensor signal and the shifted version of the sensor signal to generate a signal output representing the signal component of the sensor signal; wherein
   the BSS module is configured to:
      generate a plurality of independent component signals; and
      process the independent component signals to generate the signal output based on a signal-to-noise ratio measurement (SNRM) of each of the independent component signals.

8. The computer system as recited in claim 7, wherein the BSS module is configured to generate the signal output based on the independent component signals having a SNRM that exceeds a threshold.

9. The computer system as recited in claim 7, wherein the sensor signal represents a spectrogram of a time-varying signal.

10. The computer system as recited in claim 7, wherein the sensor signal represents an image of an object.

11. A computer system for processing a sensor signal comprising a signal component and a noise component, the computer system comprising:

a computer implemented signal shifter configured to generate a shifted version of the sensor signal;

a computer implemented blind source separator (BSS) module configured to process the sensor signal and the shifted version of the sensor signal to generate a signal output representing the signal component of the sensor signal;

a computer implemented adder configured to add a reference signal to the sensor signal prior to generating the shifted version of the sensor signal; and a computer implemented deconvolver configured to use the reference signal to deconvolve the signal output based on a transfer function of the signal shifter.

12. The computer system as recited in claim 11, wherein the sensor signal represents a spectrogram of a time-varying signal.

13. A computer implemented method of reducing noise in a sensor signal comprising a signal component and a noise component, the method comprising:

using a computer to shift the sensor signal to generate a shifted version of the sensor signal;

using a computer implemented blind source separator (BSS) module to process the sensor signal and the shifted version of the sensor signal to generate a signal output representing the signal component of the sensor signal; and causing the BSS module to generate a plurality of independent component signals and process the independent component signals to generate the signal output; wherein the BSS module generates the signal output based on a signal-to-noise ratio measurement (SNRM) of each of the independent component signals.

14. The method as recited in claim 13, further comprising having causing the BSS module to generate a noise output representing the noise component of the sensor signal.

15. The method as recited in claim 13, wherein the BSS module generates the signal output based on the SNRM of each of the independent component signals exceeding a threshold.

16. A computer implemented method of reducing noise in a sensor signal comprising a signal component and a noise component, the method comprising:

using a computer to shift the sensor signal to generate a shifted version of the sensor signal;

using a computer implemented blind source separator (BSS) module to process the sensor signal and the shifted version of the sensor signal to generate a signal output representing the signal component of the sensor signal;

using the computer to add a reference signal to the sensor signal prior to generating the shifted version of the sensor signal; and using the computer to deconvolve the signal output based on the reference signal and a transfer function of shifting the sensor signal.

17. The method as recited in claim 16, wherein the BSS module performs independent component analysis (ICA).

18. The method as recited in claim 16, further comprising using the computer to shift a base signal output by a sensor to generate the sensor signal.

19. The method as recited in claim 16, wherein the sensor signal represents an image of an object.

20. The method as recited in claim 16, wherein the sensor signal represents a spectrogram of a time-varying signal.

21. A computer system for processing a sensor signal comprising a signal component and a noise component in order to control a vehicle, the computer system comprising:

a computer implemented signal shifter configured to generate a shifted version of the sensor signal;

a computer implemented blind source separator (BSS) module configured to process the sensor signal and the shifted version of the sensor signal to generate a signal output representing the signal component of the sensor signal; and a computer implemented vehicle controller configured to generate a vehicle control signal based on the signal output, wherein the vehicle control signal is for controlling at least one of a steering or a speed of the vehicle.

22. The computer system as recited in claim 21, wherein the BSS module performs independent component analysis (ICA).

* * * * *